Dec. 8, 1931.   J. W. PEASE   1,835,720
FRUIT PARING MACHINE
Filed May 2, 1929   2 Sheets-Sheet 1
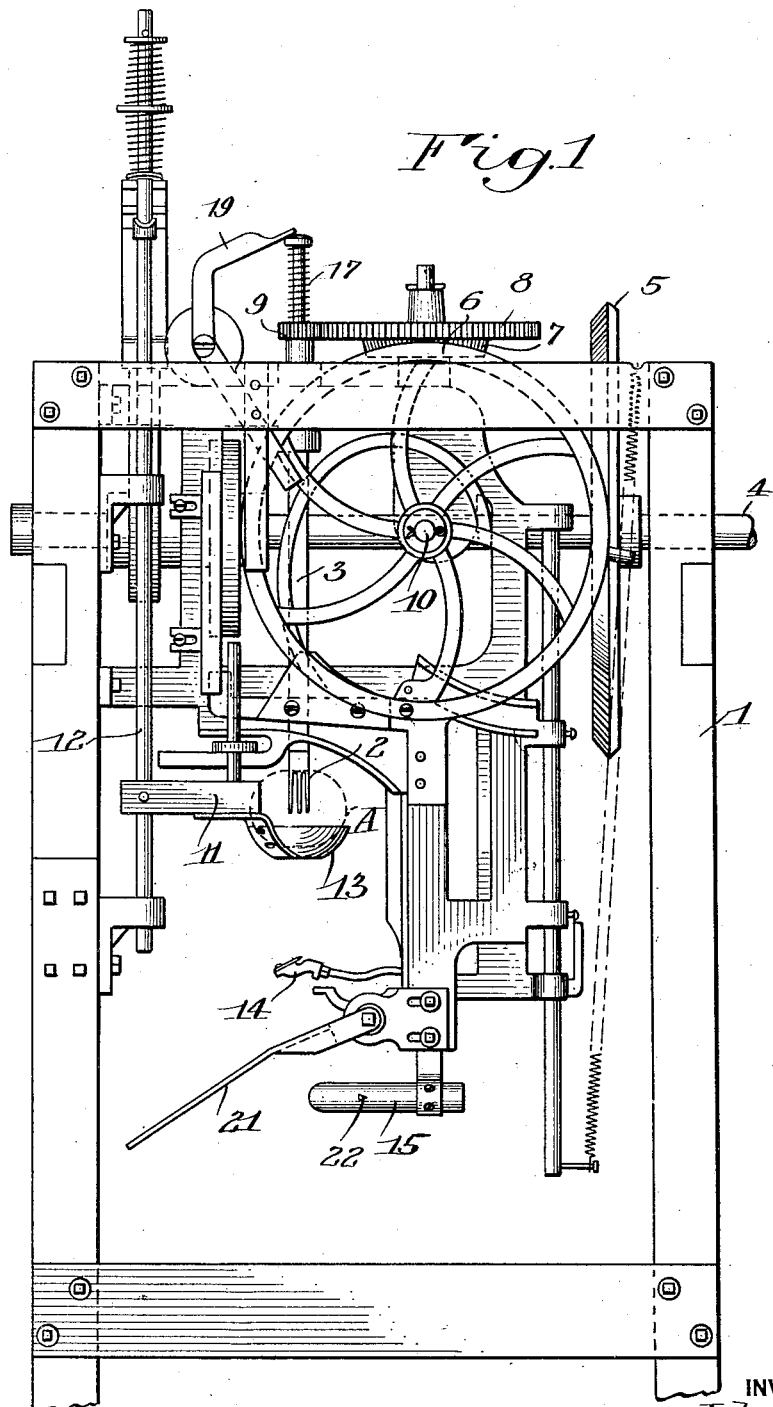
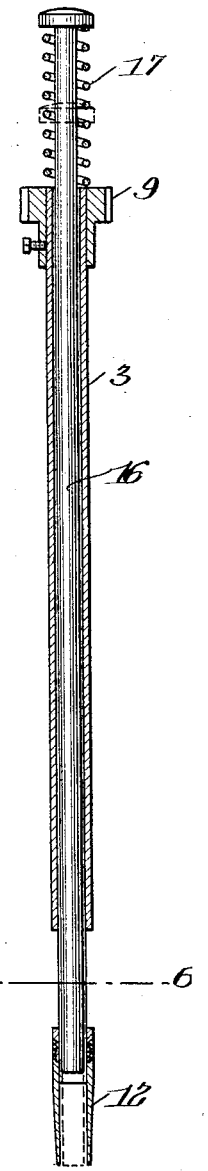
INVENTOR
John W. Pease
BY
his ATTORNEYS Dec. 8, 1931.  J. W. PEASE  1,835,720
FRUIT PARING MACHINE
Filed May 2, 1929  2 Sheets-Sheet 2
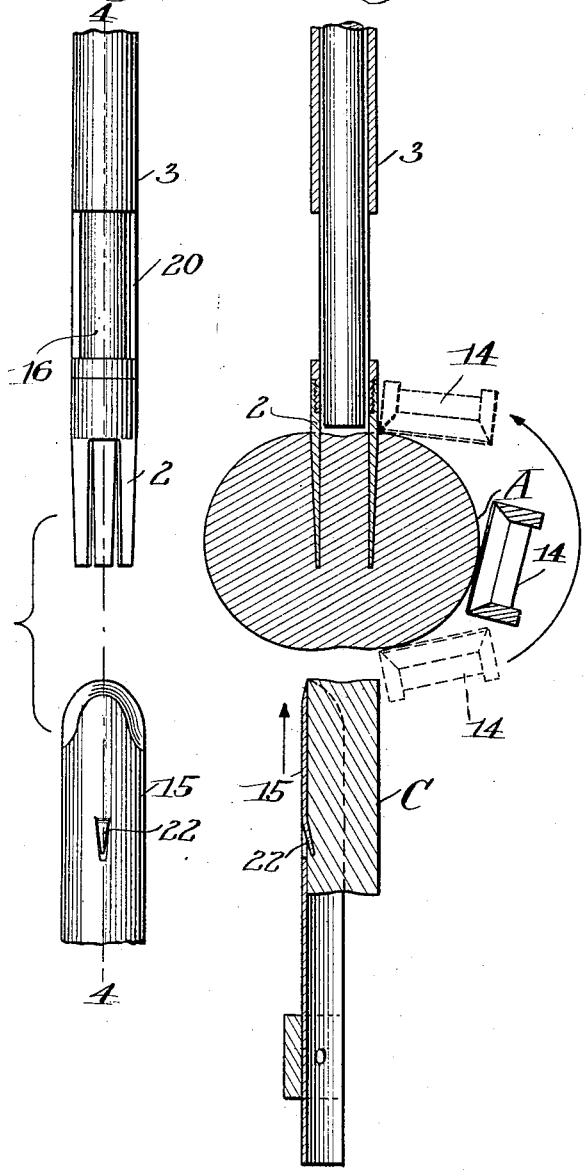
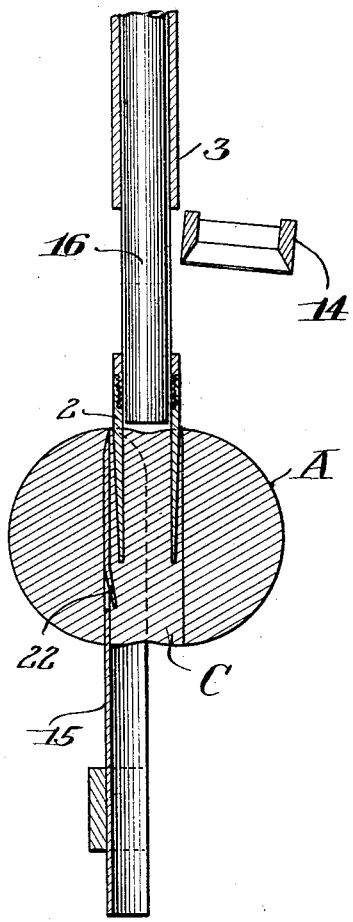
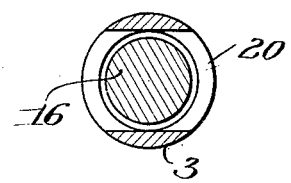
INVENTOR
John W. Pease Patented Dec. 8, 1931

1,835,720

UNITED STATES PATENT OFFICE

JOHN W. PEASE, OF ROCHESTER, NEW YORK

FRUIT PARING MACHINE

Application filed May 2, 1929. Serial No. 359,895.

My present invention relates to fruit paring machines and more particularly to machines of the nature of apple paring machines which usually embody relatively rotary holding and paring elements by which the apples or other fruit are intermittently fed, together with a coring machine which removes the core from the apple during its rotation on the fork. This invention is an improvement upon that of my prior Patent No. 1,615,914, dated February 1, 1927, although features thereof are also applicable to other types of machines. The improvements herein relate to the push rod or similar element associated with the fork to doff the apple with precision and regularity, and the object is to improve the working conditions of this push rod or doffer, whereby it will not become clogged through accumulations of apple juice and bits of pulp.

To these and other ends the invention resides in certain improvements and combinations of parts, all as will be hereinafter more fully described, the novel features being pointed out in the claim at the end of the specification.

In the drawings:

Fig. 1 is a front view of an apple paring machine constructed in accordance with and illustrating one embodiment of my invention, the lower portion of the frame thereof being broken away;

Fig. 2 is an enlarged longitudinal central section through the impaling fork shaft removed;

Fig. 3 is a further enlarged collective view showing in side elevation the lower end of the impaling fork and the upper end of the coring spoon in the relationship that they assume just before the spoon enters an apple held on the fork;

Fig. 4 is a section on the line 4—4 of Fig. 3, showing an apple (also in section) on the fork and a section of a previously cored apple on the coring spoon, the paring knife being also shown in section in its cooperation with the apple and in full line at the end of its paring stroke;

Fig. 5 is a view similar to Fig. 4 but showing the parts in the positions they take at the instant the apple is completely cored, and Fig. 6 is an enlarged horizontal section through the fork shaft and extractor taken on the line 6—6 of Fig. 2.

Similar reference numerals throughout the several views indicate the same parts.

I have illustrated my improvement as applied to the machine disclosed in my said prior patent and, therefore, it is not deemed necessary to describe herein the complete machine in detail. I will therefore describe briefly only its major parts and point out those parts which I have improved through this invention and the manner in which I changed it. The frame 1 supports a paring machine operating fundamentally on the general principle of the usual modern machine with the exception that the impaling fork 2 and its shaft 3 are arranged vertically and turned on a fixed vertical axis. They are driven from a driving shaft 4 which through gearing 5, 6, 7, 8 and 9 rotates the fork intermittently, which intermittent movement is effected through the intermediate cam or timing gear 6 on a cam shaft 10. The last gear 9 is secured, as shown in Fig. 2, to the tubular fork shaft 3.

A laterally swinging feeder arm 11 on a reciprocatory vertical shaft 12 and embodying a fruit holding cup 13 impales the apple A on the fork by first swinging inwardly into alinement with the latter and then moving upwardly along the axis of the fork in a straight line to the position shown in Fig. 1, at which time the fork is at rest. This done, the feeder reverses its path of movement and gets out of the way. The paring knife 14, controlled through the cam shaft 10, next moves up into engagement with the lower or blow end of the apple, as shown in dotted lines in Fig. 4, and thence swings in the usual way through the path indicated by the arrow through the position shown in full line in the said figure to the position shown in dotted lines above, at which point the apple has been completely pared, the fork, of course, being in rotation during this time. Continued movement of the knife as usual carries it clear of the completely pared apple and fork, as shown in full lines in Fig. 5.

While the fork is still rotating, the coring spoon 15 swings up from the position of Fig. 1 to that of Figs. 3 and 4 in alinement with the fork and thence travels along its axis in a straight line from the position of these figures to that of Fig. 5, entering and coring the apple, whereat the fork is again brought to rest. Up to this point, the mechanism is the same as that disclosed in my said prior patent. My improvements are as follows:

In common practice as well as in my prior machine, it has been the custom to drive the coring spoon 15 into the apple practically simultaneously with the start of the paring knife 14 from the dotted line position of Fig. 4, so that the apple was cored and pared simultaneously. Thus the rotating apple in its security upon the fork was subjected all at once to the double strain of the corer and the parer. In the case of soft apples and particularly those having soft cores, the result was that the apple was stopped or so retarded by the two elements acting upon it that the fork acted in the nature of a drill, the proper functions of the elements were prevented, and the apple severely mutilated or broken to pieces. With my present invention, I pare the apple first and, just as this is completed and the knife has reached the upper dotted line position of Fig. 4, the coring spoon 15 moves into the apple or at least it has not gone so far as to destroy the grip of the fork therein which, of course, it does as soon as it has cut the core from around the fork as in Fig. 5. In other words, the paring is completed before the tips of the fork and coring spoon have met or passed each other. The actuating pin 23 on the gear 6 is so placed, as to engage the cam 24 on the cover carriage 25 and accomplish this correlative turning of the coring spoon.

Referring now to Figs. 1 and 2, the shaft 3 of the paring fork is made hollow for the purpose of accommodating within it a vertically reciprocatory push rod 16 which is adapted to move between the full and dotted line positions of Fig. 2. As thus shown, it is held in a raised or retracted position by a spring 17 (as in all figures) and when depressed extends to the ends of the fork tines. At about the point shown in Fig. 5, this ejector rod 18 is depressed in timed relation to the other movements of parts by a bell crank actuating lever 19 engaged by the cam gear 6. I have found that the pulp of the apple is apt to work up into the tube of the fork shaft jamming therein and drying the gummy mass that prevents the ejector rod from working properly and necessitates its removal for the purpose of cleaning the bore in which it slides. To relieve this condition, I partially cut away the sides of the tubular shaft 3 at 20 as close to the fork 2 as possible, as best shown in Fig. 6. This allows the pulp débris to escape and keeps the bearing of the rod clean.

It will be borne in mind at this point that it is usual in paring machines of this nature to so arrange and time the parts that, beginning with the position of Fig. 5, the coring spoon 15 moves downwardly carrying the apple with it and leaving the core on the fork 2. Thereafter the ejecting rod 16 operates, in such cases, to doff the core from the fork while the apple is being doffed from the spoon at a point below. With the present machine, the arrangements and timings are such that the ejecting rod 16 is actuated at the point illustrated in Fig. 5 immediately at the end of the coring operation and while the apple, coring spoon, fork and core are all associated together. That is, the reverse of the just described operation is effected in that the core is carried away later providing the ejecting rod 16 functions properly.

With structures such as have been so far herein described, even the ejector 16 does not always effect the removal of the core from the apple before the coring spoon carries the apple away, which it does by a return movement in the same path, that is, first downwardly in a straight line and then with a swinging movement back to the normal position shown in Fig. 1. During the said swinging movement, the corer passes between the arms of a doffer fork 21 which throws the apple to one side while the core is supposed to drop below into another receptacle. To insure separation of the apple from both spoon and core at this doffing point 21, I provide the spoon 15 with an inwardly ejector spur or projection inclined in a direction away from its point and indicated at 22. The core being indicated at C, Fig. 4 illustrates the case in which the core and apple were carried away together from the fork and the coring spoon is coming back with that core on it ready to enter the next apple, the spur 22 having served to extract the core at the doffing point 21 and left the apple free. This, of course, represents an extreme case of the persistence of the core as in nearly every case the core will fall off the spoon 15 during the movements of the core from the doffer 21 where the apple is freed to the normal position of Fig. 1 and then up to the position of Fig. 4. If however the latter position is reached with the core still sticking to the coring spoon, the entrance of the spoon into the next apple will dislodge it and allow it to fall with certainty.

With the instrumentalities described, there is a very small chance of a core being detained in the apple as the latter leaves the doffer 21 and inasmuch as, for canning purposes, a single core with its seeds and cell walls practically spoils a can of apples, the use of this invention will very materially reduce the losses heretofore sustained in this way and effect the successful paring and coring and clean delivery of apples of a grade not otherwise suitable.

I claim as my invention:

In an apple coring machine, the combination with an apple impaling and holding fork, a tubular rotary shaft therefor, and a coring spoon having cooperative relationship with the fork, of a reciprocatory nonrotatable core ejecting plunger fitting loosely within and nowhere as great in diameter as the bore of the tubular fork shaft, said fork shaft being provided with a lateral discharge opening immediately adjacent to the bases of the fork tines adapted to free the plunger from the resistance of bits of apple entering the tubular fork shaft from the vicinity of the fork and the plunger being removable from the shaft in a direction away from the fork.

JOHN W. PEASE.